United States Patent [19]

Chen

[11] Patent Number: 4,958,826
[45] Date of Patent: Sep. 25, 1990

[54] PAPER FEED SYSTEM HAVING A PRESSURE PLATE THAT RESILIENTLY URGES A PLURALITY OF ELONGATED BEARING, SPRING BIASED IDLER ROLLERS AGAINST ASSOCIATED DRIVE ROLLERS FOR FEEDING A SHEET OF PAPER THEREBETWEEN

[75] Inventor: Philip L. Chen, Ranchos Palos Verdes, Calif.

[73] Assignee: Microtek Lab., Inc., Torrance, Calif.

[21] Appl. No.: 230,157

[22] Filed: Aug. 8, 1988

[51] Int. Cl.$^5$ .......................... B65H 3/52; B65H 5/02
[52] U.S. Cl. ..................................... 271/124; 271/274
[58] Field of Search ............... 271/109, 121, 124, 274, 271/272

[56] References Cited

U.S. PATENT DOCUMENTS

| | | | |
|---|---|---|---|
| 3,948,511 | 4/1976 | Smith et al. | 271/274 |
| 4,361,399 | 11/1982 | Sawada et al. | 271/274 X |
| 4,526,358 | 7/1985 | Ura et al. | 271/124 X |
| 4,535,981 | 8/1985 | Watanabe et al. | 271/124 X |
| 4,552,353 | 11/1985 | Tanaka et al. | 271/124 |
| 4,620,807 | 11/1986 | Polit | 271/274 X |
| 4,667,244 | 5/1987 | Ishikawa | 271/121 X |
| 4,667,253 | 5/1987 | Chen | 378/57 X |
| 4,674,735 | 6/1987 | DuBois et al. | 271/274 X R |
| 4,763,575 | 8/1988 | Miciukiewicz | 271/274 X |

FOREIGN PATENT DOCUMENTS 1235037 5/1960 France .................................. 271/274

Primary Examiner—Andres Kashnikow
Assistant Examiner—Kenneth DeRosa
Attorney, Agent, or Firm—Edward A. Sokolski

[57] ABSTRACT

A plurality of pinch rollers are employed to drive sheets of paper containing material to be scanned past an optical scanner to generate an optical image of the material which is converted into electrical signals. Each pinch roller includes a drive roller which is driven by a synchronized drive mechanism and an idler roller. The support shafts for the idler rollers are supported in elongated bearings which provide limited freedom of motion for the idler rollers in a direction substantially normal to their axes of rotation. A pressure plate has spring fingers which resiliently urge the idler rollers towards the drive rollers to resiliently pinch the paper sheets being driven. In the event that the paper should become jammed and needs to be removed or repositioned, a roller release lever can be actuated to drive the pressure plate so as to permit the idler rollers to move freely in their elongated support bearings. Further, a friction pad is provided which rides on the surface of the paper so that in the event that more that one sheet of paper should pass through the rollers only the lowermost sheet will pass through.

5 Claims, 4 Drawing Sheets

PAPER FEED SYSTEM HAVING A PRESSURE PLATE THAT RESILIENTLY URGES A PLURALITY OF ELONGATED BEARING, SPRING BIASED IDLER ROLLERS AGAINST ASSOCIATED DRIVE ROLLERS FOR FEEDING A SHEET OF PAPER THEREBETWEEN

This invention relates to a paper feed system for an opto-electric scanner and more particularly to such a system which employs pinch rollers for driving the paper.

In my U.S. Pat. No. 4,667,253 issued May 19, 1987 and assigned to Microtek Lab, Inc., the assignee of the present application, an optical line scanner is described which employs pinch rollers in driving sheets of paper to be optically scanned past an optical scanner. In the event of a paper jam or other equipment malfunction, it is necessary to release the paper from the rollers in a simple and expeditious manner. This end result is achieved in my prior patent by mounting the idler rollers on a floating bracket which is resiliently urged towards the drive rollers. A release lever is provided to cause the floating bracket to be driven so as to release the idler rollers from the drive rollers. The system of the present invention provides an improved mechanism for achieving this end result in that it is of simpler more compact construction. Further the system of the present invention is capable of operating a plurality of idler rollers which are spaced over a fairly large distance with a single lever. In addition, the system of the present invention provides means for separating two sheets from each other, permitting only a single sheet to be fed through the rollers, this in the event that more than one sheet is inadvertently carried into the rollers.

This improved operation is achieved in the present invention by employing a pressure plate which resiliently urges the idler rollers towards the drive rollers. The idler rollers are supported in elongated bearings for limited freedom of motion normal to their rotation axes. A release arm can be actuated to drive the pressure plate to a position whereat it does not drive the idlers, permitting the idler rollers to move away from the drive rollers so that the paper can be removed or repositioned. Further a tension pad of friction material is provided which abuts against the upper face of the paper being fed through the rollers. Thus, if there is more than one sheet in the feed system, the upper sheet will be held by the pad while the lowermost sheet will be permitted to pass through, avoiding the feeding of more than one sheet at a time.

It is therefore an object of this invention to provide an improved paper feeding system for an opto-electronic scanner.

It is a further object of this invention to provide a paper release for a paper feed system which is capable with a single actuation of releasing a plurality of pinch rollers which are separated from each other by a fair distance.

It is still a further objection of this invention to provide means for separating multiple sheets of paper from each other in a pinch roller paper feed system.

Other objects of this invention will become apparent from the following description taken in connection with the accompanying drawings of which:

Figure 1:
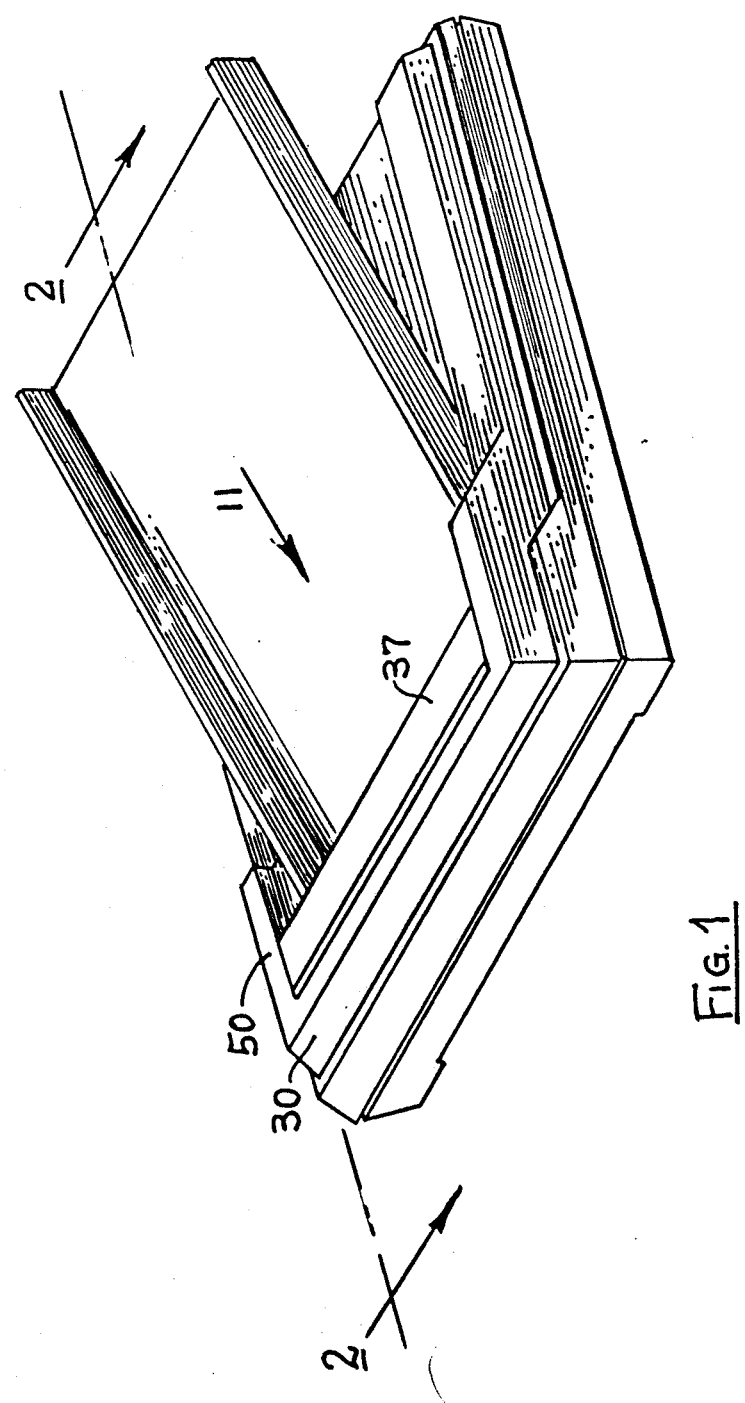
FIG. 1 is a perspective view of a preferred embodiment of the invention.
Figure 2:
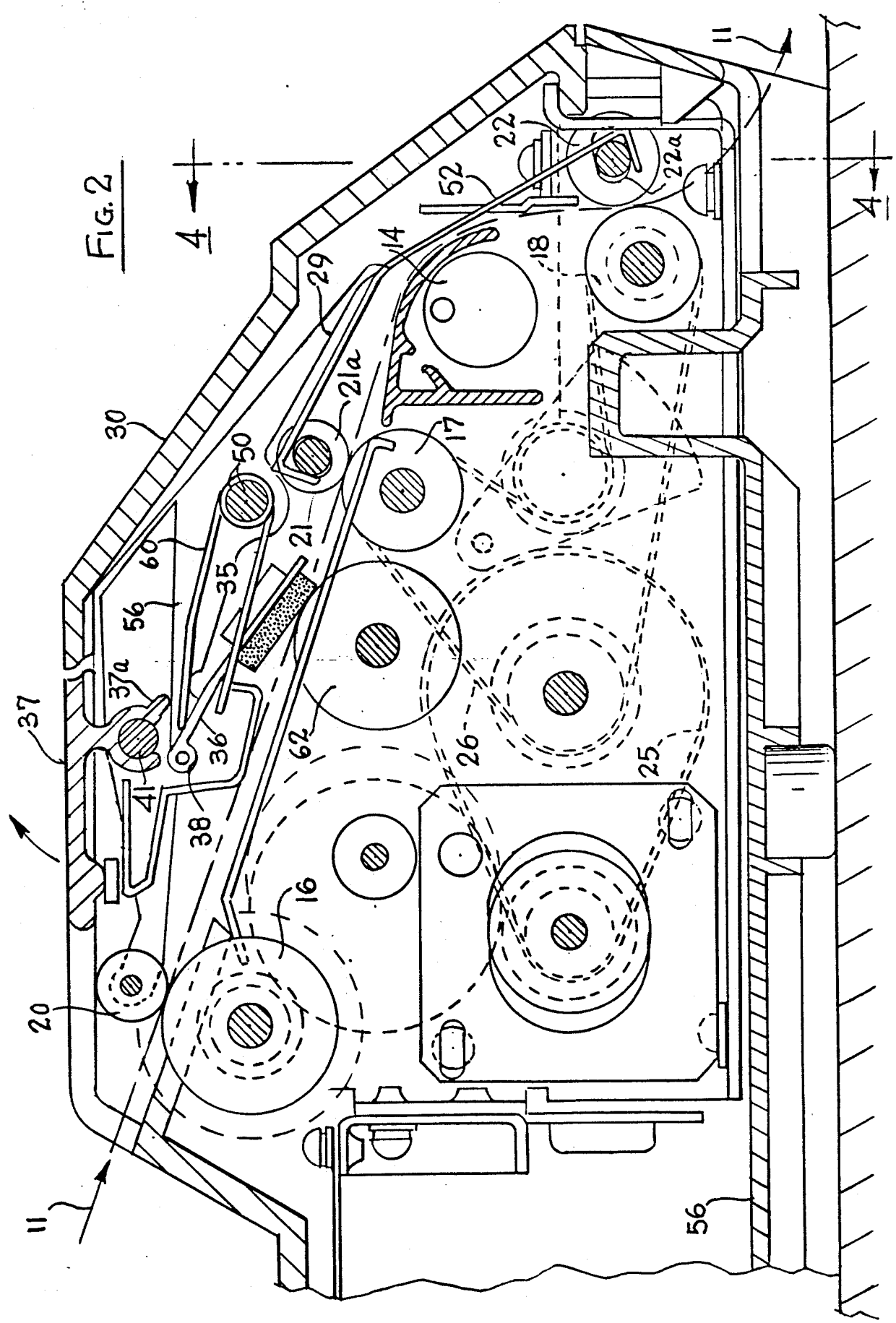
FIG. 2 is a cross sectional view taken along the plane indicated by 2—2 in FIG. 1 showing the preferred embodiment in its normal operating condition.
Figure 4:
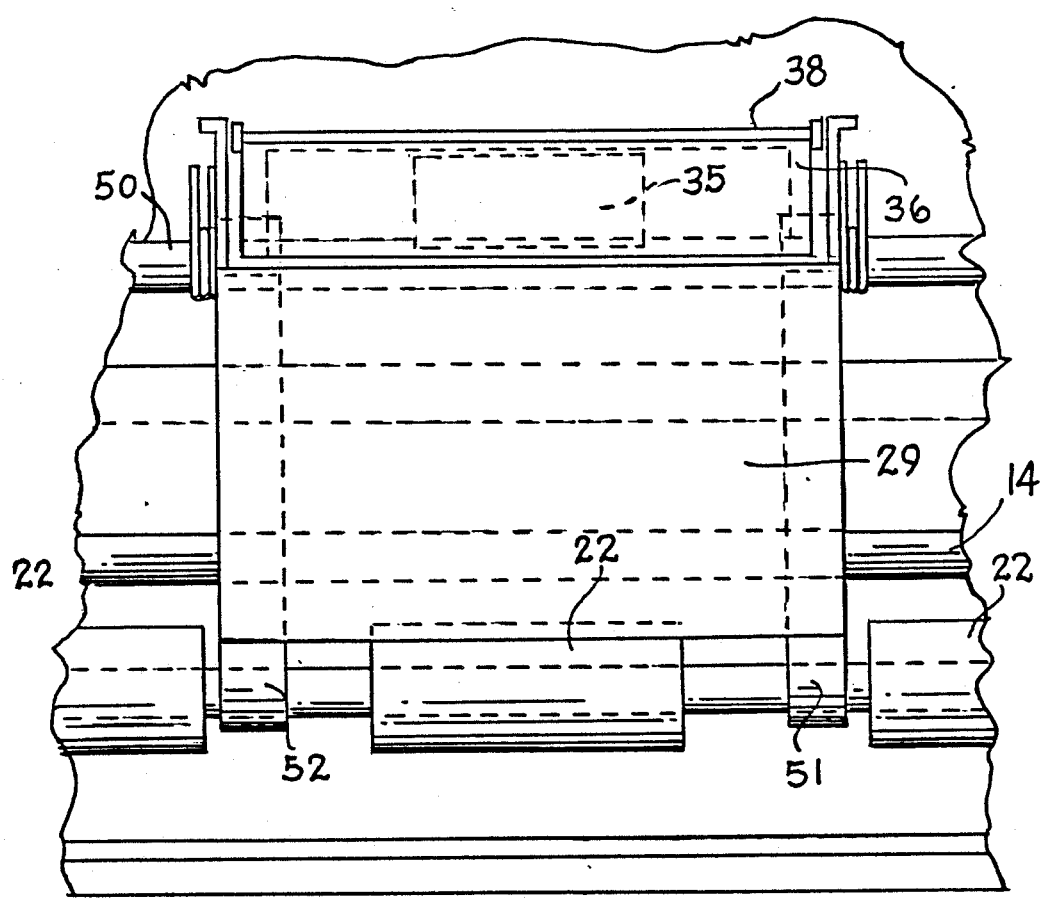
FIG. 4 is a front elevational view taken along the plane indicated by 4—4 in FIG. 2 of the pressure plate employed in the device of the invention.

Referring now to FIGS. 1, 2 and 4, the preferred embodiment is shown in its normally operating condition. The paper 11 to be scanned is fed past the scanner which includes a lamp 14 by means of pinch rollers formed by drive rollers 16, 17, and 18 which operate in conjunction with idler rollers 20, 21 and 22 respectively. The support shafts for idler rollers 21 and 22 are mounted in elongated bearings 21a and 22a respectively so that these rollers have limited freedom of motion along axes normal to their rotation axes. Pressure plate 29 has a pair of spring fingers 51 and 52 which abut against the idler roller drive shafts and resiliently urges these rollers towards their associated drive rollers such that the paper is pinched between the paired rollers. Pressure plate 29 is pivotally supported on the shaft 50 which in turn is mounted on the support frame 56. The top end of pressure plate 29 is urged upwardly by means of springs 60 so that the portion thereof on the opposite side of pivot support shaft 50 which includes spring fingers 51 and 52 is urged against the idler roller shafts. The paper inlet pinch roller which is formed by drive roller 16 and idler roller 20 has a separate spring for urging the idler towards the drive roller and can be separately lifted manually in the manner of a conventional typewriter roller. The scanner may be of the type described in my U.S. Pat. No. 4,667,253. The drive rollers are driven by means of a motor (not shown) operating in conjunction with a series of drive belts 25 and 26 and others (not shown). The entire assembly is mounted within a housing 30 which can readily be disassembled to enable repair of the equipment. Pressure pad 35 is fixedly attached to flat plate 36 which in turn is pivotally supported on pressure plate 29 by means of hinge pin 38. Pad 36 rests on the paper 11 by virtue of gravity but may additionally be urged against the paper by means of a spring. The pad is fabricated of a suitable friction material such as rubber and is positioned at an angle to the uppermost or stack of sheets 11 so as to impede its advancement. The bottom sheet, being in contact with the driver roller 62, which by design has higher friction than the friction pad 36, is pushed past pad 35 and further transported through the scanner by the rollers 17 and 18 and their associated idlers 21 and 22 respectively.

Figure 3:
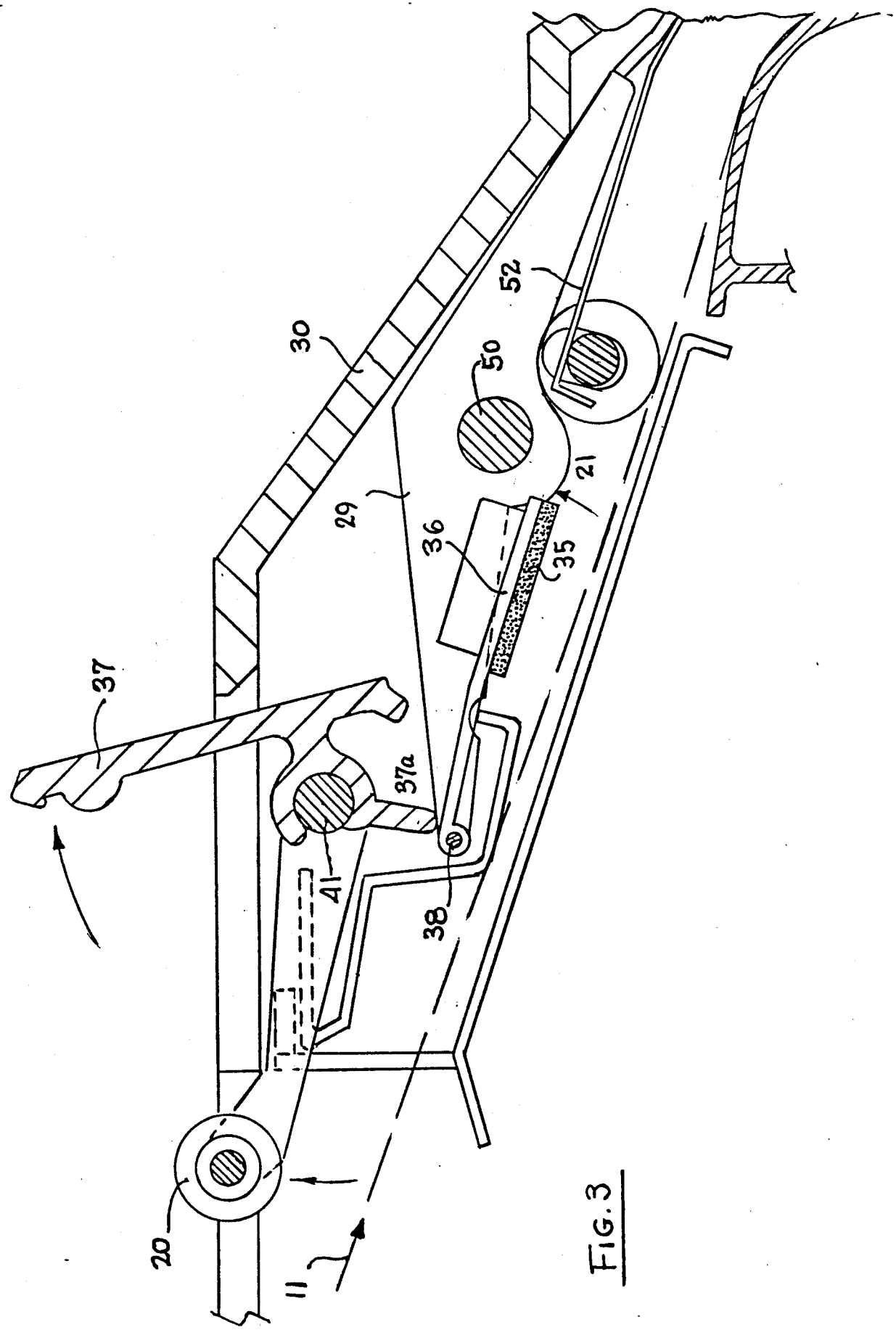
FIG. 3 is a cross sectional view showing the preferred embodiment with the paper release lever in the "release" position.

Referring now to FIG. 3, the device is shown with the release lever actuated to release the idler rollers from the drive rollers and thus free the paper. Release lever 37 normally forms part of the top wall of housing 30 and is pivotally supported on support pin 41. When lever 37 is positioned as shown in FIG. 3, the end 37a thereof abuts against pressure plate 29 and drives this plate away from the idler wheels 21 and 22 leaving these wheels free from their associated drive wheels 17 and 18, the idler wheels being free to ride upwardly in their associated elongated bearings. In this manner the pinch rollers release their hold on the paper 11 so that it can either be withdrawn or adjusted in place as may be desired.

The system of the invention thus provides a paper feeder for a device such an opto-electronic scanner having a paper release mechanism which operates to release widely separated pinch rollers with a single actuation of a lever. In addition, a simple yet highly effective mechanism is provided for separating multiple sheets from each other in the event that they should be inadvertently fed into the feed system at the same time.

While the invention has been described and illustrated in detail, it is to be clearly understood that this is intended by way of illustration and example only and is not to be taken by way of limitation, the spirit and scope of the invention being limited only by the following claims.

I claim:

1. In a paper feed system for feeding sheets of paper along a predetermined path, said system including a plurality of pinch rollers formed by pairs of drive rollers and idler rollers, each of said idler rollers being rotatably supported on a support shaft, the improvement being means for resiliently urging said idler rollers towards said drive rollers to drive a sheet of paper therebetween and means for releasing the idler rollers from said resilient urging comprising:

elongated bearing means for supporting each of said idler rollers for limited freedom of motion along an axis normal to the rotation axis thereof, a pressure plate, pivotal support means for pivotally supporting said pressure plate for motion about a predetermined pivot axis substantially parallel to the rotation axes of said idler rollers, said pressure plate including spring means abutting against each of said idler roller support shafts at points spaced laterally from and on one side of said pivot axis, spring means for resiliently urging said pressure plate pivotally about said support means to cause said pressure plate spring means to urge each of said idler rollers against its associated drive roller, and a release lever, said release lever having a first position whereat it does not drive said pressure plate and a second position whereat it drives against said pressure plate at a point therealong spaced laterally from and on the side of said pivot axis opposite to said one side thereof so as to drive said plate out of engagement with said idler rollers thereby permitting said idler rollers to move freely in their elongated bearings away from their associated drive rollers.

2. The system of claim 1 wherein there are two pairs of idler and drive rollers which are separated from each other, said pressure plate spring means comprising a pair of spring fingers which abuts against the shafts of said idler rollers.

3. The system of claim 1 wherein said release lever is pivotally mounted and is adapted to be manually actuated to the release position whereat it abuts against the pressure plate to drive it out of engagement with the idler rollers.

4. In a paper feed system for feeding sheets of paper along a predetermined path, said system including a plurality of pinch rollers formed by pairs of drive rollers and idler rollers, each of said idler rollers being rotatably supported on a support shaft, the improvement being means for resiliently urging said idler rollers towards said drive rollers to drive a sheet of paper therebetween and means for releasing the idler rollers from said resilient urging comprising:

elongated bearing means for supporting each of said idler rollers for limited freedom of motion along an axis normal to the rotation axis thereof, a pressure plate, pivotal support means for pivotally supporting said pressure plate for motion about a predetermined pivot axis substantially parallel to the rotation axis of said idler rollers, said pressure plate including spring means abutting against each of said idler roller support shafts at points spaced laterally from and on one side of said pivot axis, spring means for resiliently urging said pressure plate to cause said spring means to urge each of said idler rollers against its associated drive roller, pressure pad means which abuts against the top surface of the paper as it is being fed between said rollers for providing friction against the top surface of the paper to permit any second sheet of paper therebelow to move through the rollers first, said pressure pad means comprising a plate, means for pivotally supporting said plate and a pad of friction material affixed to said plate, said pad abutting against said paper surface, and a release lever, said release lever having a first position whereat it does not drive said pressure plate and second position whereat it drives against said pressure plate at a point therealong spaced laterally from and on the side of said pivot axis opposite to said one side thereof so as to drive said plate out of engagement with said idler rollers thereby permitting said idler rollers to move freely in their elongated bearings away from their associated drive rollers.

5. The paper feed system of claim 4 wherein the means for pivotally supporting said plate comprises a hinge pin which supports said plate for freedom of pivotal motion, said pad abutting against the paper surface by virtue of the force of gravity.

* * * * *